US010648807B1

(12) United States Patent
Hesh

(10) Patent No.: US 10,648,807 B1
(45) Date of Patent: May 12, 2020

(54) SOLID STATE ANALOG ALTIMETER SWITCH

(71) Applicant: UNITED STATES OF AMERICA AS REPRESENTED BY THE ADMINISTRATOR OF NASA, Washington, DC (US)

(72) Inventor: Scott V. Hesh, Greenbackville, VA (US)

(73) Assignee: United States of America as represented by the Administrator of NASA, Washington, DC (US)

(*) Notice: Subject to any disclaimer, the term of this patent is extended or adjusted under 35 U.S.C. 154(b) by 231 days.

(21) Appl. No.: 15/846,431

(22) Filed: Dec. 19, 2017

(51) Int. Cl.
*G01L 7/14* (2006.01)
*G01C 5/06* (2006.01)

(52) U.S. Cl.
CPC ..................... *G01C 5/06* (2013.01)

(58) Field of Classification Search
CPC .......... G01C 5/06; G01C 5/005; G01C 25/00; G01C 21/20; G01C 21/206; G01C 25/005; G01C 15/002; G01C 21/00; G01C 21/005; G01C 21/04; G01C 21/16; G01C 21/165; G01C 21/26; G01C 21/265; G01C 22/006; G01C 5/00
USPC .................................... 73/384–387
See application file for complete search history.

(56) References Cited

U.S. PATENT DOCUMENTS

| | | | | |
|---|---|---|---|---|
| 2,613,329 A | * | 10/1952 | Hewes | G01C 5/06 250/231.11 |
| 4,106,343 A | * | 8/1978 | Cook | G01C 5/06 73/387 |
| 4,433,323 A | | 2/1984 | Grove | |
| 4,492,246 A | * | 1/1985 | Prescott | G05D 16/18 137/85 |
| 4,694,694 A | * | 9/1987 | Vlakancic | G01C 5/06 368/11 |
| 2015/0032357 A1 | * | 1/2015 | Dudar | F02D 41/021 701/103 |
| 2015/0153171 A1 | * | 6/2015 | Zhou | G01C 5/06 702/138 |

OTHER PUBLICATIONS

Litton PRC/NASA Sounding Rocket Operations Contract, On-line http://www.nsroc.com/front/index.html.
NASA Sounding Rockets User Handbook Sounding Rockets Program Office Sub-orbital and Special Orbital Projects Directorate, NASA Goddard Space Flight Center Wallops Flight Facility, Jul. 2015, pp. 1-181, VA.

\* cited by examiner

*Primary Examiner* — Andre J Allen
(74) *Attorney, Agent, or Firm* — Christopher O. Edwards; Bryan A. Geurts

(57) ABSTRACT

The invention disclosed herein includes various embodiments and components of a solid state analog altimeter switch useful for generating switching signals based on altitude determined from barometric pressure. Embodiments of the solid state analog altimeter switch disclosed herein are designed to be extremely accurate, small, robust and inexpensive to produce. Such solid state analog altimeter switches are particularly useful for generating switching events based on predetermined altitudes in sounding rockets.

13 Claims, 14 Drawing Sheets

SOLID STATE ANALOG ALTIMETER SWITCH

ORIGIN OF INVENTION

Invention by Government employees only. The invention described herein was made by employees of the United States Government, and may be manufactured and used by or for the Government for governmental purposes without the payment of any royalties thereon or therefor.

BACKGROUND OF THE INVENTION

Field of the Invention

The present invention relates generally to switches triggered by preset altitude. More particularly, this invention relates to a solid state analog altimeter switch.

Description of Related Art

A sounding rocket, sometimes referred to as a research rocket, is an instrument-carrying rocket designed to take measurements and perform scientific experiments during its sub-orbital flight. Sounding rockets are typically used to carry instruments in a range from 50 to 1500 kilometers above the surface of the earth. The National Aeronautics and Space Administration (NASA) routinely launches sounding rockets for various scientific missions.

Typical sounding rockets may include a solid-fuel rocket motor to lift a science payload. Average flight times are less than 30 minutes and usually between 5 and 20 minutes in duration. The freefall part of the typical sounding rocket flight is an elliptic trajectory with vertical major axis. This trajectory allows the payload to appear to hover near its apogee. A sounding rocket may consume its fuel on the first stage of the rising part of the flight. Once the fuel is consumed, the first stage separates and falls away, leaving the payload to complete and elliptical arc in its flight path before returning to ground under a parachute. Larger, higher altitude rockets may have 2 to 4 stages to increase efficiency and payload capability.

Sounding rockets are advantageous for some research because of the relatively low cost, and their ability to conduct research at altitudes inaccessible to either balloons or satellites. Sounding rockets may also be used as test beds for equipment that will be used in more expensive and risky orbital spaceflight missions.

In-flight event timing is typically controlled by electronic timers and/or barometric switches. When rocket payloads rapidly ascend in the atmosphere during launch, ambient atmospheric pressure drops quickly to essentially zero. A barometric switch may be used to monitoring atmospheric pressure and appropriately triggering events based on atmospheric pressure.

Atmospheric pressure is correlated to altitude. So an altimeter switch can be based on atmospheric pressure. By knowing current atmospheric pressure, p, and comparing that to sea level pressure, $p_o$, and determining the difference between the two numbers, a table can be used to determine altitude. For example, the following equation may be used for determining the height difference:

$$z = \left(\frac{RT}{gM}\right)\ln\left(\frac{p_0}{p}\right)$$

where z is the height difference between the starting height (sea level) and the measurement height, R is the gas constant, T is temperature of the air in degrees Kelvin, g is the acceleration due to gravity, M is the molar mass of the gas (in this case air), $p_o$ is the atmospheric pressure at the starting height (sea level) and $\rho$ is the atmospheric pressure at the measurement height.

An altitude switch could have many applications. For example and not by way of limitation, an altitude switch may be used to prevent second stage firing prior to reaching an appropriate altitude.

Conventional altitude switches designed for harsh environments tend to be inaccurate, large, unreliable, and expensive to produce. Conventional altitude switch designs for harsh environments are mechanical in nature and operate by means of an inflatable bladder or bellows that mechanically depresses a push-button switch. The altitude trip point is set by mechanically adjusting the distance of the switch to the bellows. In addition to mechanical switches conventional altitude switches typically require hours of hand wiring and soldering to fabricate.

The mechanical action of the conventional barometric switch limits precision to tolerances of several thousand feet, forcing engineers to design systems with up to 40% error tolerance. Additionally, conventional altitude switches are large, expensive, and unreliable from a manufacturing as well as harsh environment tolerance standpoint.

Accordingly, there exists a need in the art for a solid state analog altimeter switch that could be used reliably in sounding rocket applications and other harsh environments.

SUMMARY OF THE INVENTION

The invention disclosed herein includes various embodiments and components of a solid state analog altimeter switch which solves many of the shortcomings associated with conventional altitude switches. Embodiments of the solid state analog altimeter switch disclosed herein are designed to be extremely accurate, small, robust and inexpensive to produce.

An embodiment of a switch circuit is disclosed. The embodiment of a switch circuit may include a relay configured for receiving a low-power input signal and outputting a high-power normally-open output switching signal corresponding to the low-power input signal. The switch circuit may further include a high-power driver configured for receiving the low-power input signal and configured for generating a driving signal based on the low-power input signal. The switch circuit may further include at least one high-power transistor in communication with the solid state relay and the high-power driver and configured for receiving the driving signal, the at least one high-power transistor generating a high-power normally closed signal and a common signal in response to the driving signal.

An embodiment of a solid state altitude circuit is disclosed. The solid state altitude circuit may include a solid state pressure sensor configured for measuring an absolute barometric pressure and outputting an analog pressure voltage corresponding to a difference between the absolute barometric pressure and a reference vacuum pressure. The solid state altitude circuit may further include at least one comparator in communication with the solid state pressure sensor for receiving the analog pressure voltage and comparing it to at least one input set voltage corresponding to a preselected pressure, the preselected pressure further corresponding to a preselected altitude above sea level, the comparator generating a trigger signal based on comparing the analog pressure voltage to the at least one set voltage. The solid state altitude circuit may further include at least one high-power switch in communication with the comparator for receiving the trigger signal and driving the at least one high-power switch to an on state or an off state based on the trigger signal.

An embodiment of a solid state analog altimeter switch is disclosed. The embodiment of a solid state analog altimeter switch may include a resistor network configured for delivering a plurality of preselected set voltages, each of the preselected set voltages corresponding to a preselected altitude above sea level. The embodiment of a solid state analog altimeter switch may further include a solid state altitude circuit in communication with the resistor network and configured to receive the plurality of preselected voltages.

BRIEF DESCRIPTION OF THE DRAWINGS

The following drawings illustrate exemplary embodiments for practicing the invention. Like reference numerals refer to like parts in different views or embodiments of the present invention in the drawings.

DETAILED DESCRIPTION

The invention is a solid state analog altimeter switch. The solid state analog altimeter switch finds numerous applications where electrical switch functions are desired to be carried out at preselected altitudes above sea level. Embodiments of the solid state analog altimeter switch are particularly useful for triggering or protecting events in rockets, generally, and sounding rockets used for scientific experiments, particularly.

Embodiments of the solid state analog altimeter switch disclosed herein address many of the shortcomings associated with conventional altitude switches. More particularly, embodiments of the solid state analog altimeter switch disclosed herein are designed to be extremely accurate, small, robust and inexpensive to produce.

One embodiment of the solid state analog altimeter switch may be configured for switching 8 independently programmed events. For example and not by way of limitation, an event may be a predetermined altitude. Embodiments of the solid state analog altimeter switch may be designed from completely solid state electronics, adding to the ruggedness of the design. Embodiments of the solid state analog altimeter switch may also be configured in a small package or enclosure. For example and not by way of limitation, one embodiment of the solid state analog altimeter switch measures approximately 3" wide×4" long×1" tall. The compact size of this particular embodiment of a solid state analog altimeter switch may be one third the size of conventional altitude switches.

One particular embodiment of the solid state analog altimeter switch may incorporate solid state electronics on a printed circuit board (PCB). The circuitry for the various embodiments and components of an embodiment of a solid state analog altimeter switch as disclosed herein may be manufactured using existing electronics manufacturing lines using any suitable electronics manufacturing processes known to those of ordinary skill in the art. Additionally, volume manufacturing of the PCB embodiments of the solid state analog altimeter switch may lead to manufacturing time-savings, cost-savings and high levels of quality assurance.

Figure 1:
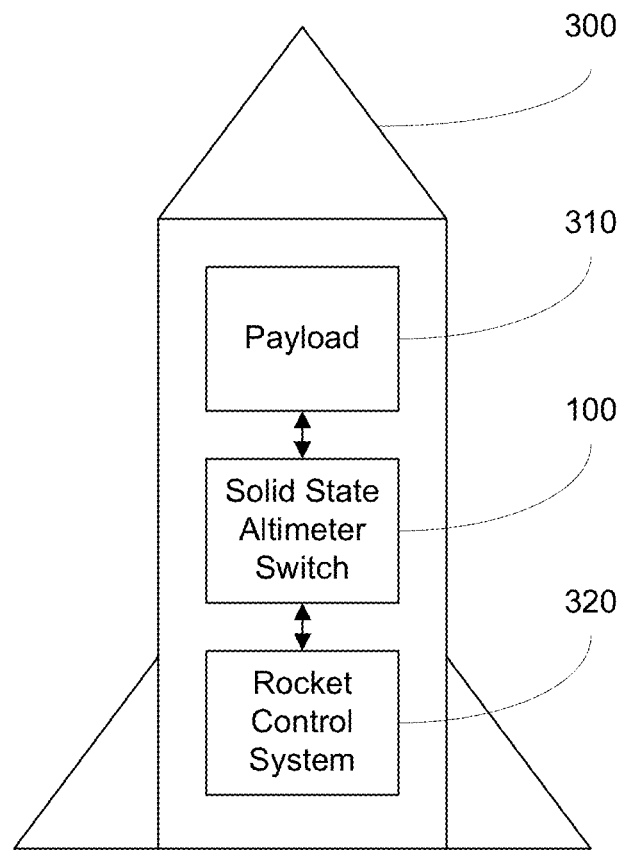
FIG. 1 is a simplified block diagram of an exemplary sounding rocket including an embodiment of a solid state analog altimeter switch, according to the present invention.

Referring now to FIG. 1, a simplified block diagram of an exemplary sounding rocket 300 including an embodiment of a solid state analog altimeter switch 100 is shown, according to the present invention. The solid state analog altimeter switch 100 may be a component of the sounding rocket 300 that provides electrical switching events to payload 310 and/or rocket control system 320 components on-board. Payload 310 may be one or more scientific experiments (not shown) that require deployment, safety hold-off, or altitude knowledge at a specified altitude. The solid state analog altimeter switch 100 is well-suited to provide such electrical switching events to payload 310 components. Similarly, the rocket control system 320 may have certain components, for example and not by way of limitation, ignition of stages, or parachute deployment, that are designed for ignition/hold-off or deployment at, or within specific ranges of, altitude. Again, the solid state analog altimeter switch 100 is well-suited to provide such electrical switching events to rocket control system 320 components on-board the sounding rocket 300.

Figure 2:
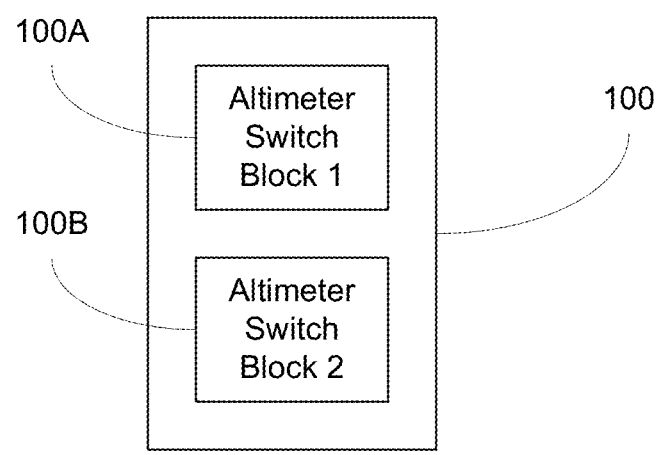
FIG. 2 is a block diagram of an embodiment of a solid state analog altimeter switch having two independent altimeter switch blocks, according to the present invention.

FIG. 2 is a block diagram of an embodiment of a solid state analog altimeter switch 100 having two independent altimeter switch blocks 100A and 100B, according to the present invention. The independent altimeter switch blocks 100A and 100B may be used for redundancy or independently as needed. Each independent altimeter switch blocks 100A and 100B is capable of measuring absolute barometric pressure and generating electrical switching events based on preselected altitudes. According to another embodiment not shown in FIG. 2, a second altimeter switch 100 may be added to the system to provide cross-coupled redundancy for accurate parachute deployment, see FIG. 9 and related description below.

Figure 3A:
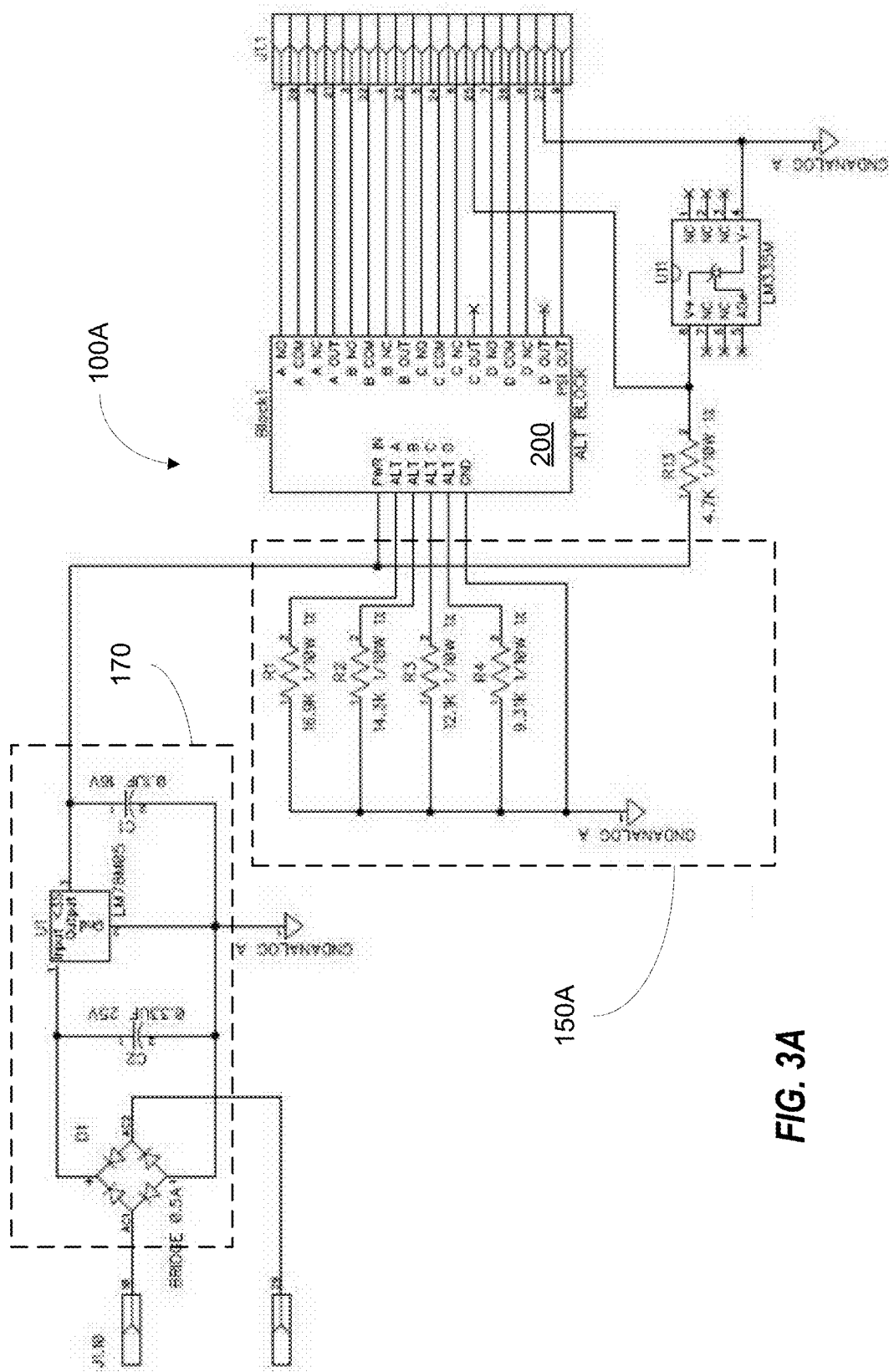
FIG. 3A is a circuit diagram of an embodiment of an altimeter switch block, according to the present invention.

FIG. 3A is a circuit diagram of an embodiment of an independent altimeter switch block 100A, according to the present invention. An embodiment of an altimeter switch block 100A may include an altitude circuit 200, a resistor network, shown in dashed box 150A, and power conditioning circuitry, shown in dashed box 170, as illustrated in FIG. 3A.

Figure 3B:
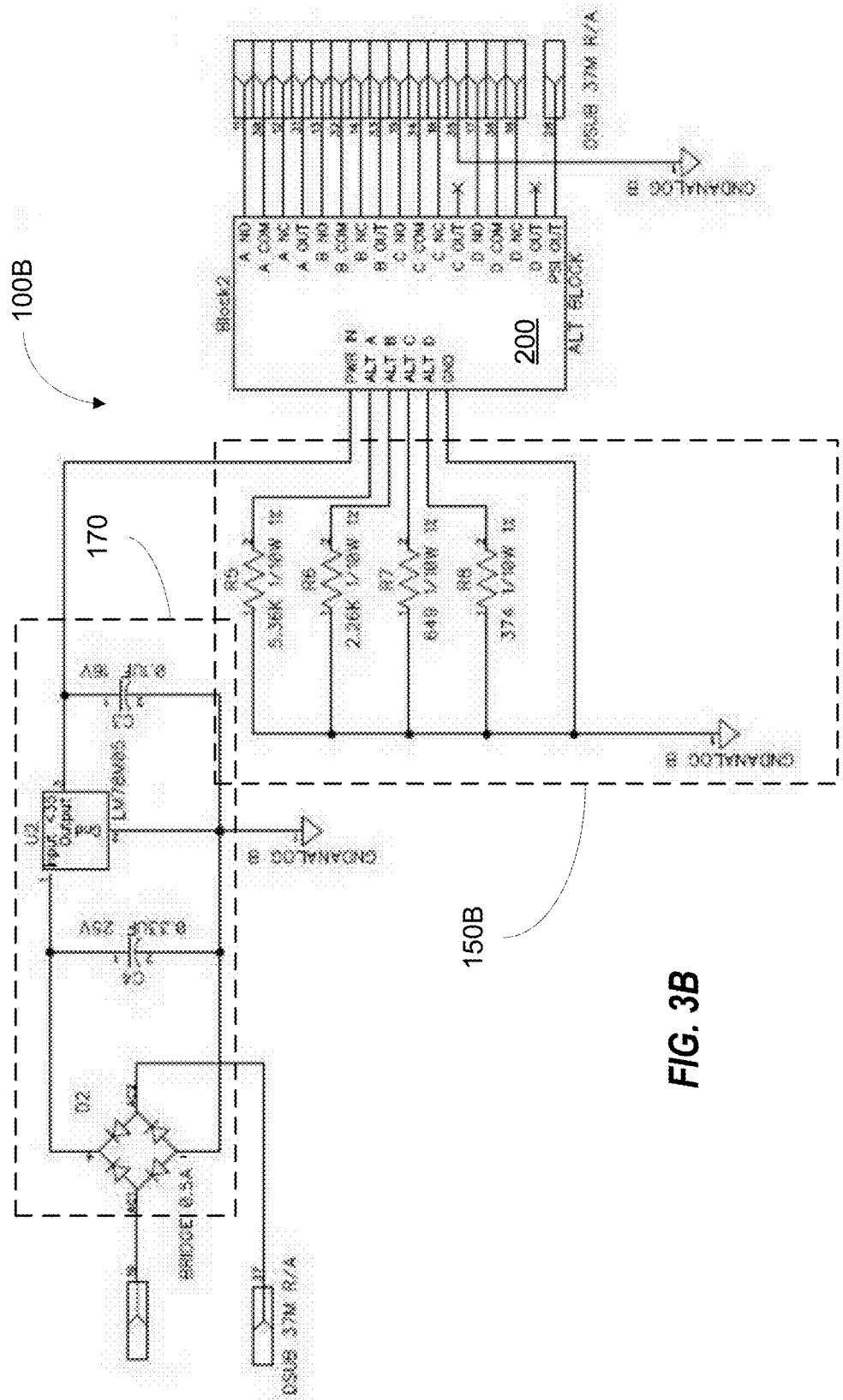
FIG. 3B is a circuit diagram of another embodiment of an altimeter switch block, according to the present invention.

FIG. 3B is a circuit diagram of another embodiment of an independent altimeter switch block 100B, according to the present invention. An embodiment of an altimeter switch block 100B may also include an altitude circuit 200, a resistor network, shown in dashed box 150B, and power conditioning circuitry, shown in dashed box 170, as illustrated in FIG. 3B. It will be understood that altimeter switch blocks 100A and 100B have independent circuitry, so that they can each operate independently, or together, to generate up to 8 electrical switching events.

The resistor networks 150A and 150B may include a plurality of resistors (R1-R8, as shown in FIGS. 3A and 3B) of preselected electrical resistance measured in ohms, $\Omega$, that are chosen from a lookup Table 1, below.

TABLE 1

Altitude, Pressure, Output Voltage and Resistance Lookup Table

| Altitude (ft) | Pressure (kPa) | Output Voltage (V) | Resistance ($\Omega$) |
| --- | --- | --- | --- |
| 1000 | 97.63 | 3.92 | 17,060 |
| 2000 | 94.19 | 3.76 | 14,306 |
| 2500 | 92.46 | 3.69 | 13,240 |
| 3000 | 90.81 | 3.61 | 12,224 |
| 4000 | 87.49 | 3.46 | 10,580 |
| 5000 | 84.33 | 3.32 | 9290 |
| 6000 | 81.22 | 3.18 | 8211 |
| 7000 | 78.19 | 3.04 | 7312 |
| 8000 | 75.22 | 2.91 | 6543 |
| 9000 | 72.40 | 2.78 | 5900 |
| 10,000 | 69.64 | 2.66 | 5340 |
| 15,000 | 57.16 | 2.10 | 3400 |
| 20,000 | 46.61 | 1.62 | 2250 |
| 25,000 | 37.65 | 1.22 | 1520 |
| 30,000 | 30.13 | 0.88 | 1004 |
| 35,000 | 23.93 | 0.60 | 641 |
| 40,000 | 18.82 | 0.37 | 376 |
| 45,000 | 14.82 | 0.19 | 186 |

Table 1, above, correlates a particular resistance measure in ohms ($\Omega$) with an associated voltage output measured in volts (V), which in turn correlates to a particular absolute pressure measured in kilo Pascals (kPa), and most importantly for this application, altitude measured in feet (ft). It will be understood that while lookup Table 1, provides discrete correlations between altitude, pressure, output voltage and resistance, there are continuous correlations that may be calculated through interpolation, or directly, and applied for a given application that requires an altitude that is not exactly shown in Table 1. It will be further understood that the resistor networks 150A and 150B shown in FIGS. 3A and 3B could alternatively be replaced with any suitable electrical circuit that provides the reference output voltages shown in Table 1 that are correlated with altitudes shown in Table 1 to achieve a given electrical switching event using the solid state analog altimeter switch blocks 100A and 100B, or switch 100.

Resistors R1-R8 as shown in resistor networks 150A and 150B in FIGS. 3A and 3B, may be discrete resistors or potentiometers, with various power ratings, according to various embodiments of the present invention. It will be understood that the particular values for resistors R1-R8 shown in FIG. 3A-3B are merely exemplary. A particular resistance value, or corresponding output voltage which is input to altitude block 200, will be selected based on the particular altitude for which an electrical switching event is desired. Up to 8 such events may obtained using the solid state analog altimeter switch 100.

Figure 4:
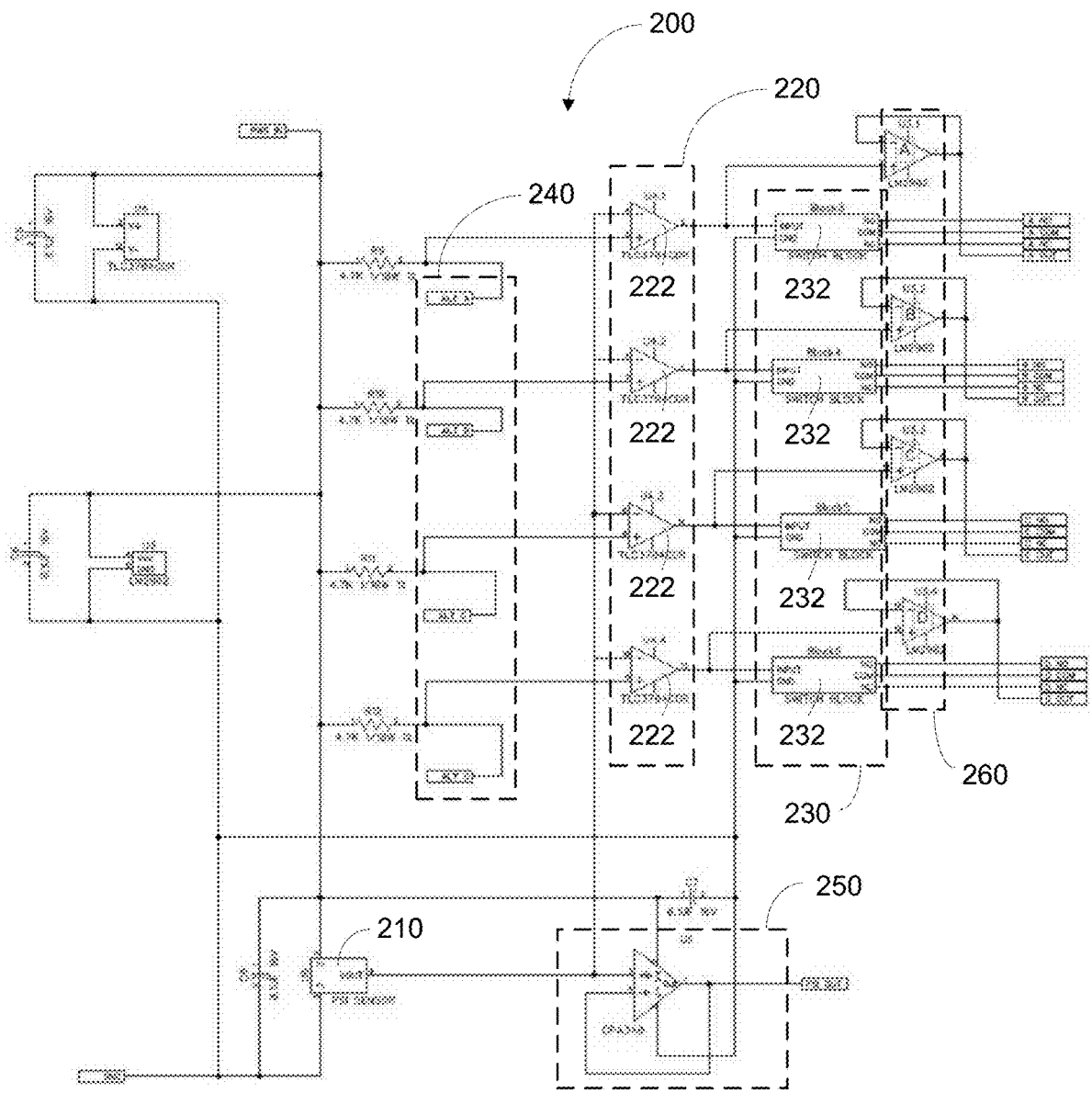
FIG. 4 is a circuit diagram of an embodiment of an altitude block, according to the present invention.

FIG. 4 is a circuit diagram of an embodiment of an altitude circuit 200, according to the present invention. The altitude circuit 200 may include a solid state pressure sensor 210, at least one comparator 222 (four comparators 222 shown in FIG. 4), see comparator grouping shown in dashed box 220. According to various embodiments of the invention, the solid state pressure sensor 210 may be a PSI sensor available from Freescale Semiconductor, with family part number MPX-6115, or for example and not by way of limitation, part number MPXH6115A6T1, as a specific embodiment. The altitude circuit may include at least one high-power switch 232 (four high-power switches 232 shown in FIG. 4), see switching circuit grouping in dashed box 230. Note that the terms "high-power switch", "switch block" and "switch circuit" are used interchangeably and synonymously herein.

Each comparator 222 compares a reference voltage (4 reference voltages, ALT A-D shown, see dashed block 240) from the resistor networks 150A and 150B to the output voltage of the pressure sensor 210. If the output voltage of the pressure sensor 210 exceeds the particular reference voltage, ALT A-D, see dashed box 240, input from the resistor networks 150A and 150B and feeding a given comparator 222, the comparator 222 outputs a trigger voltage to its corresponding high-power switch 232. The trigger voltage indicates sensing a particular set altitude, see Table 1 above.

One embodiment of an altitude circuit 200 shown in FIG. 4 may also include buffering, see dashed box 250 and signal PSI OUT, of the solid state pressure circuit output for additional user instrumentation if desired. The altitude circuit 200 shown in FIG. 4 may also include buffering, see dashed box 260, of the outputs of the high-power switches 232, again for additional user instrumentation if desired. Though a particular altitude circuit 200 has been illustrated, it will be understood that any comparable electrical circuit that performs the same or equivalent function as altitude circuit 200 could be used consistent with the teachings of the present invention.

Figure 5:
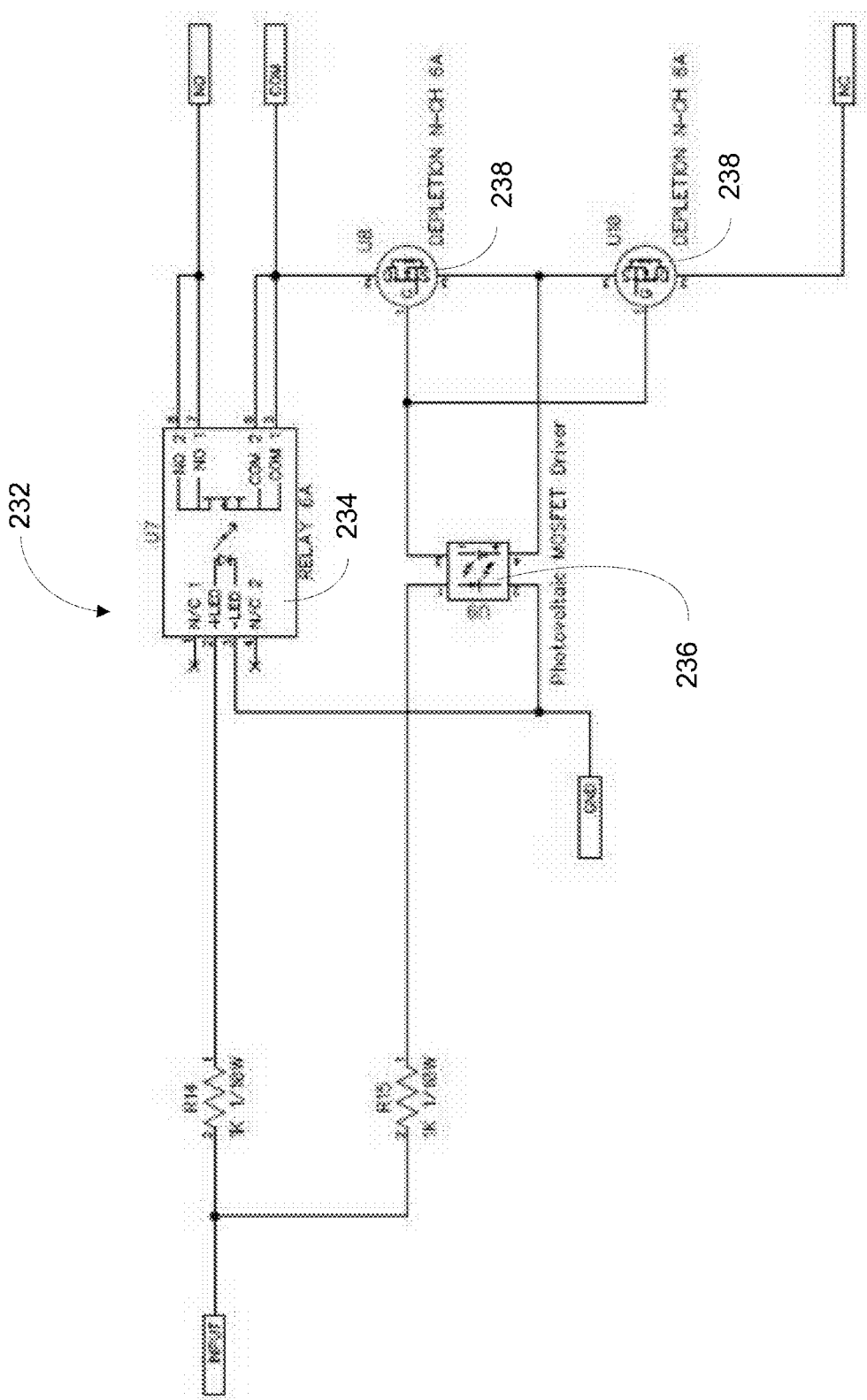
FIG. 5 is a circuit diagram of an embodiment of a switch block, according to the present invention.

FIG. 5 is a circuit diagram of a particular embodiment of a high-power switch, shown generally at arrow 232, according to the present invention. It will be understood that any other comparable electrical circuit that performs the same or equivalent function as switch 232 may be employed consistent with the teachings of the present invention. As noted above, the output of the comparators 222 shown in FIG. 4 forms an INPUT signal to high-power switch 232.

According to the embodiment of a high-power switch 232 shown in FIG. 5, the INPUT signal drives a stage of high-power MOSFETs (two MOSFETs shown at 238) via relay 234 and metal-oxide semiconductor field effect transistor (MOSFET) driver 236. The outputs of high-power switch 232 may be used to mimic traditional Normally-Open (NO) and Normally-Closed (NC) switch signals. MOSFETs 238 may be depletion N-channel transistors, such as available from IXYS, with part number, IXTT16N20D2, according to one embodiment of the invention. According to another embodiment, MOSFET driver 236 may be a photovoltaic MOSFET driver available from Microchip Technology with part number HT0440LG-G. It will be understood that any suitable MOSFET 238 or MOSFET 236 driver may be used consistent with the teachings of the present invention.

Figure 6:
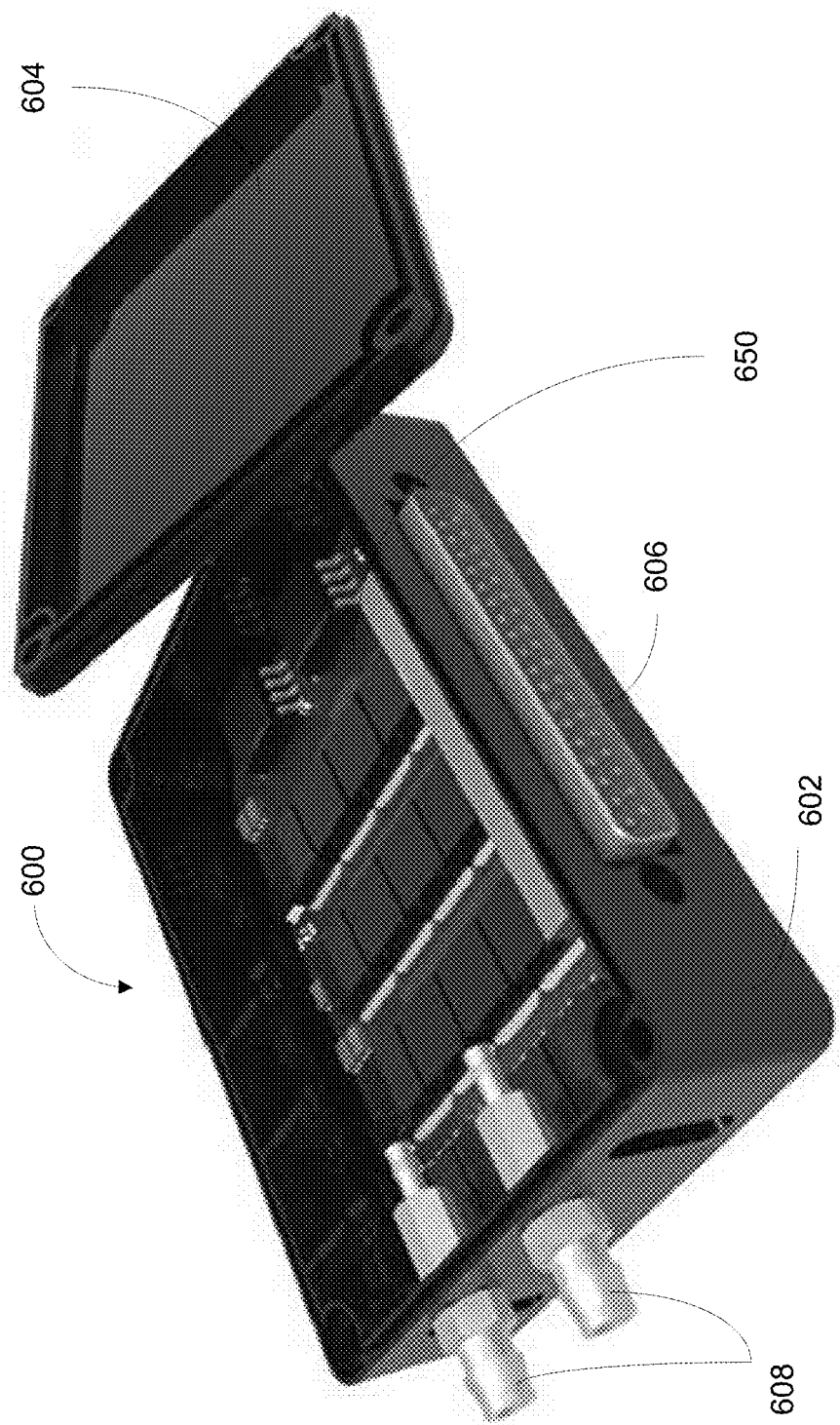
FIG. 6 is an image of an embodiment of solid state analog altimeter switch within an embodiment of an enclosure, according to the present invention.

FIG. 6 is a perspective image of an embodiment of solid state analog altimeter switch, shown generally at arrow 600, located on a printed circuit board 650 within an embodiment of an enclosure 602, according to the present invention. Enclosure 602 may have a removable cover 604 that allows access to the solid state analog altimeter switch 600 located within the enclosure 602. Removable cover 604 may be secured to the enclosure 602 using screws or other fasteners (not shown). Enclosure 602 and its mating cover 604 may be formed of any suitable material, for example and not by way of limitation, plastic, carbon fiber, or metal, etc. This embodiment of solid state analog altimeter switch 600 and its enclosure 602 may include suitable features (not shown) for mounting the solid state analog altimeter switch 600 inside the fuselage of a rocket 300 (see FIG. 1) or other device or location for which its functionality is employed.

Input and output signaling of the embodiment of solid state analog altimeter switch 600 may be accessed through electrical connector 606 that facilitates cabling (not shown) to external components (also not shown). Electrical connector 606 may be a 37-pin connector as illustrated in FIG. 6. Ambient air pressure may be ported through one or more air ports 608 (two shown). The air ports 608 may be connected to the solid state pressure sensors (210, see FIG. 4) using flexible hosing (not shown).

Figure 7:
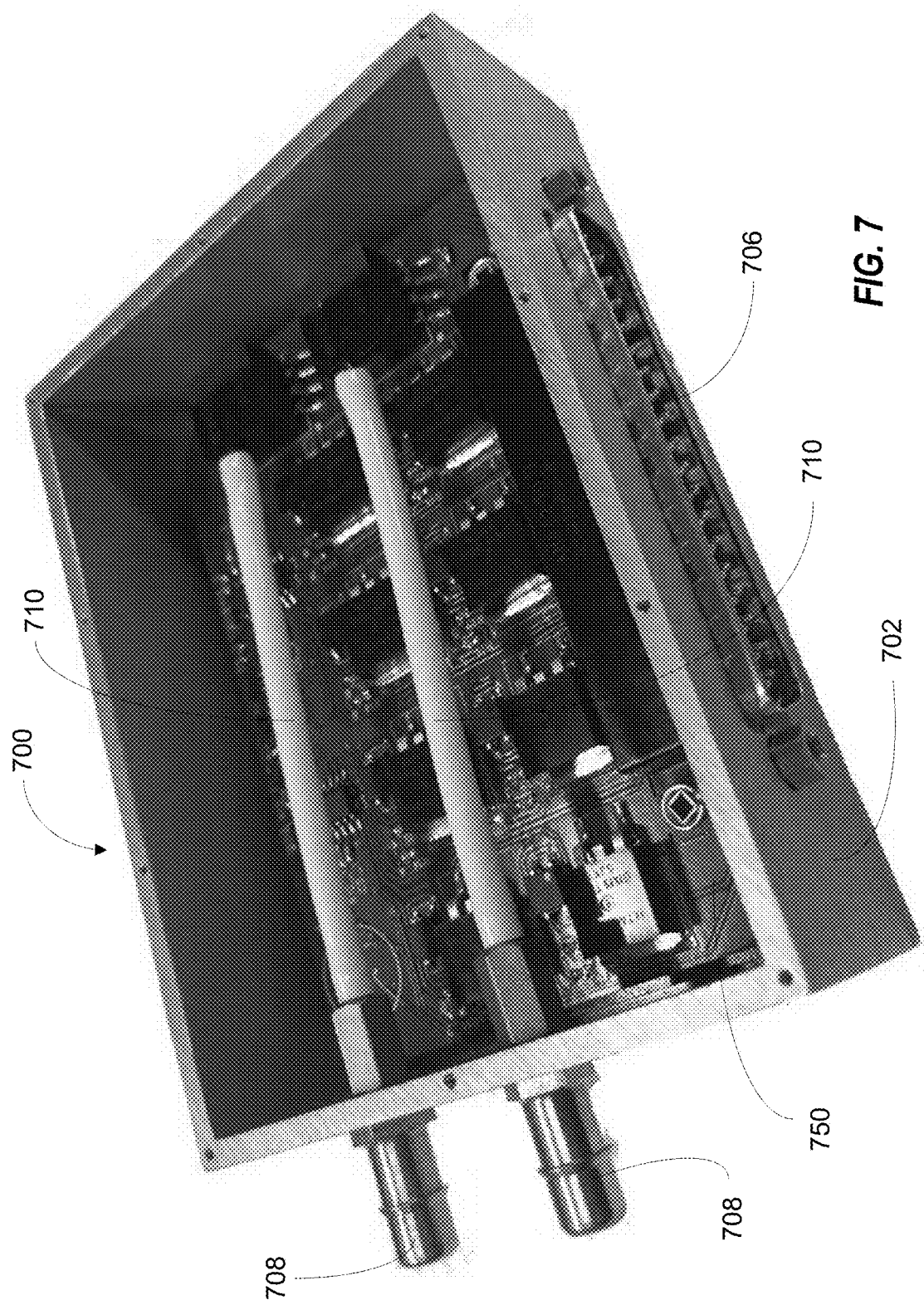
FIG. 7 is an image of another embodiment of solid state analog altimeter switch within another embodiment of an enclosure, according to the present invention.

FIG. 7 is a perspective image of another embodiment of solid state analog altimeter switch 700 within another embodiment of an enclosure 702, according to the present invention. Enclosure 702 may have a removable cover (not shown) that allows access to the solid state analog altimeter switch 700 located on a printed circuit board 750 within the enclosure 702. Removable cover (not shown) may be secured to the enclosure 702 using screws or other fasteners (not shown). Enclosure 702 and its mating cover (not shown) may be formed of any suitable material, for example and not by way of limitation, plastic, carbon fiber, or metal, etc. This embodiment of solid state analog altimeter switch 700 and its enclosure 702 may include suitable features (not shown) for mounting the solid state analog altimeter switch 700 inside the fuselage of a rocket 300 (see FIG. 1) or other device or location for which its functionality is employed.

Input and output signaling of the embodiment of solid state analog altimeter switch 700 may be accessed through electrical connector 706. Ambient air pressure may be ported through one or more air ports 708 (two shown). The air ports 708 may be connected to the solid state pressure sensors (210, see FIG. 4) using flexible hosing 710 (two shown).

Figure 8:
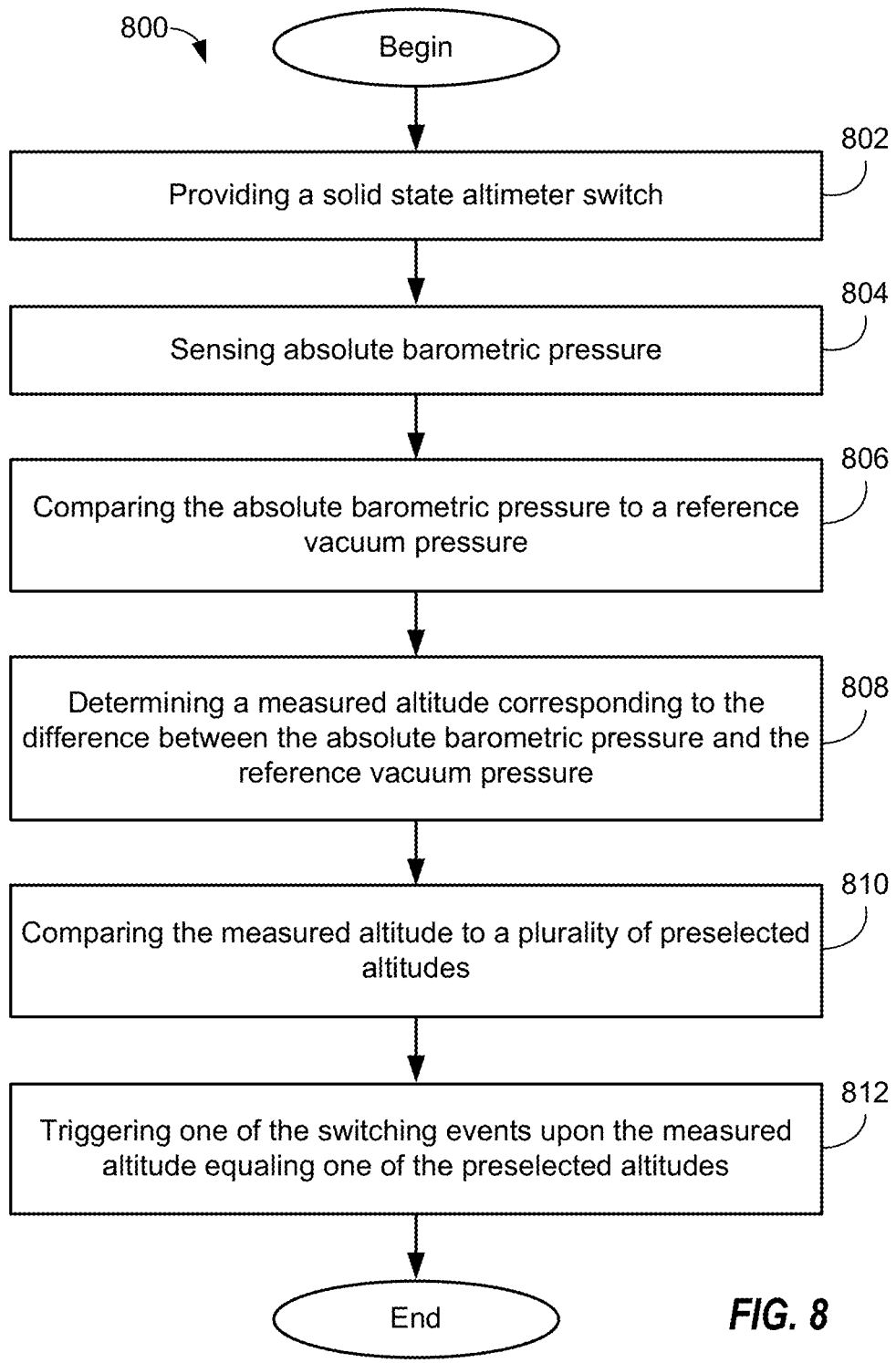
FIG. 8 is a flowchart of an embodiment of a method of triggering switching events at preselected altitudes.

FIG. 8 is a flowchart of an embodiment of a method 800 of triggering switching events at preselected altitudes. Method 800 may include providing 802 a solid state analog altimeter switch. Method 800 may further include sensing 804 absolute barometric pressure. Method 800 may further include comparing 806 the absolute barometric pressure to a reference vacuum pressure. Method 800 may further include determining 808 a measured altitude corresponding to the difference between the absolute barometric pressure and the reference vacuum pressure. Method 800 may further include comparing 810 the measured altitude to a plurality of preselected altitudes. Method 800 may further include triggering 812 one of the switching events upon the measured altitude equaling one of the preselected altitudes.

Figure 9:
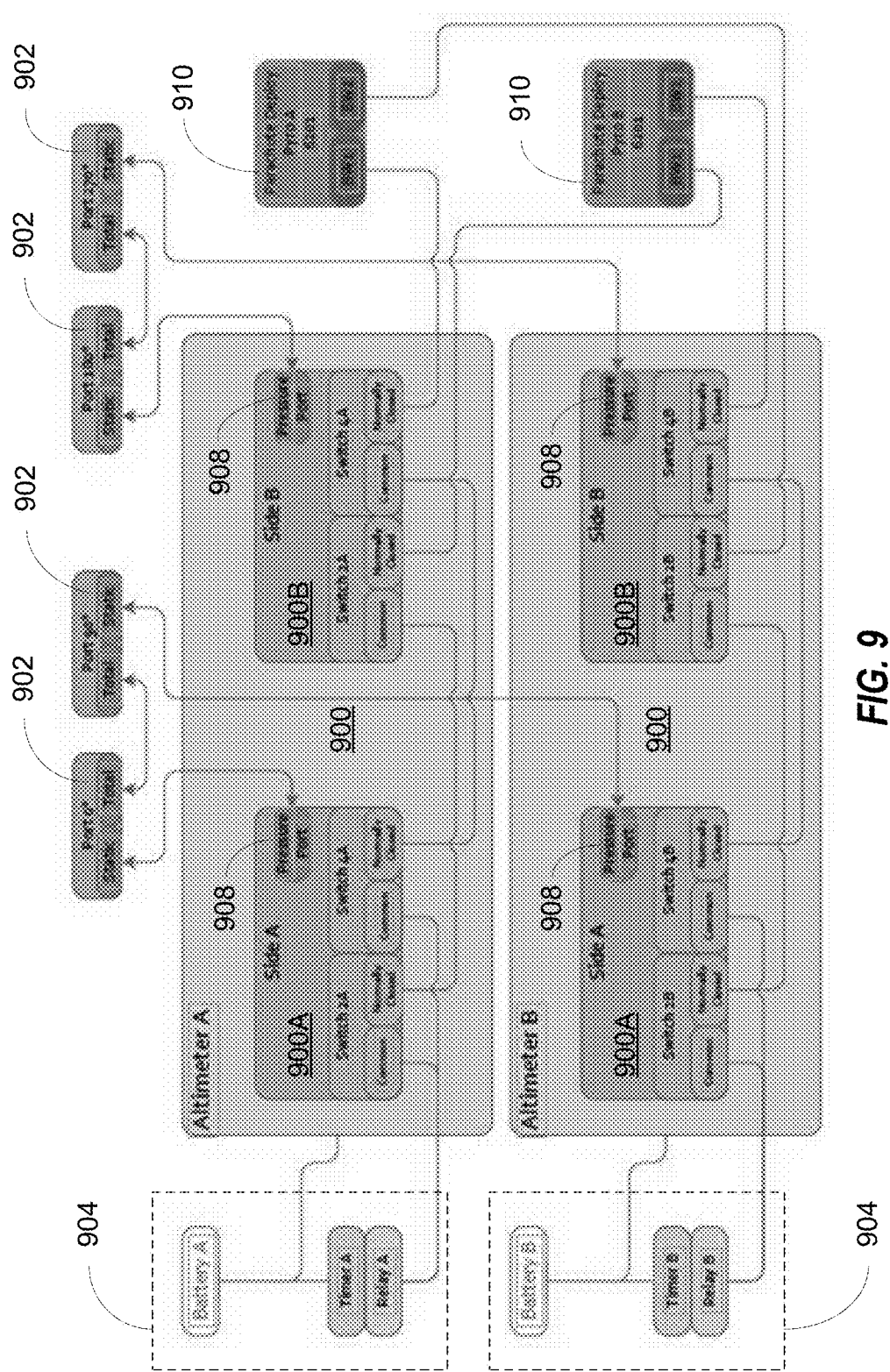
FIG. 9 is a block diagram of an embodiment of dual altimeter switches used in a sounding rocket to provide cross-coupled redundancy for accurate parachute deployment, according to the present invention.

FIG. 9 is a block diagram of an embodiment of dual analog altimeter switches 900 for use in a sounding rocket application to provide cross-coupled redundancy for accurate parachute deployment, according to the present invention. The use of dual analog altimeter switches 900 solves the potential problem of ram-air-induced pressure fluctuations causing early or late parachute deployment. By using dual analog altimeter switches 900, multiple pressure measurements may be taken and averaged, or used in a voting scheme, to assure accurate pressure measurement and switch actuation.

More particularly, FIG. 9 illustrates two altimeter switches 900, each altimeter switch 900 further including two altimeter switch blocks 900A and 900B. Four external pressure ports 902 may be disposed at 90° intervals about an enclosure (not shown) to obtain evenly spaced measurements, according to the illustrated embodiment. The external pressure ports 902 may be coupled to corresponding pressure ports 908 located on each of the four altimeter switch blocks 900A and 900B using flexible hosing (not shown in FIG. 9, but see 710 in FIG. 7) or other piping means known to those of skill in the art. FIG. 9 further illustrates batteries, timers and relays, shown in dashed line boxes 904 in communication with each altimeter switch 900. Switching signals from each altimeter switch 900 are used to drive the parachute deployment modules 910.

Figure 10:
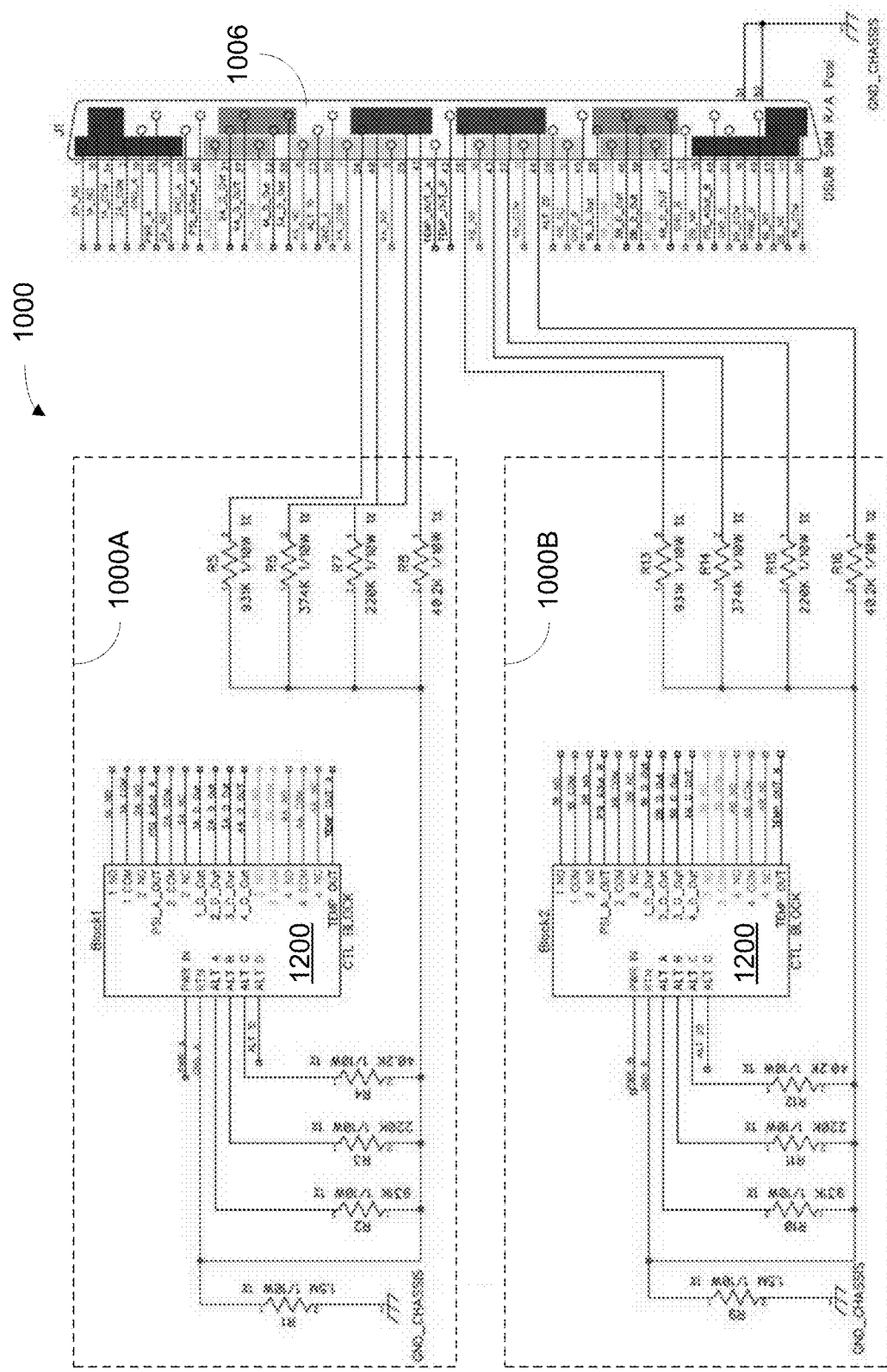
FIG. 10 is circuit diagram of another embodiment of an altimeter switch, according to the present invention.

FIG. 10 is a circuit diagram of another embodiment of a solid state analog altimeter switch 1000, according to the present invention. Altimeter switch 1000 may include two independent switch blocks 1000A and 1000B and a 50-pin header or connector 1006. The 50-pin connector 1006 offers the user more signals to monitor and control, versus the prior described solid state analog altimeter switch and its 37-pin electrical connector 606 (shown in FIG. 6).

According to one embodiment, signals ALT A, B, and C may be statically set to the following altitudes: 5000 ft, 20,500 ft and 40,000 ft, respectively. These static settings may be achieved by resistive networks R1-R8 and R9-R16 as shown in FIG. 10 or by any other means of setting a resistance known to those of ordinary skill in the art. According to other embodiments, ALT D may be interface-wired for altitude settings of 5000 ft, 15,000 ft, 20,500 ft, or 40,000 ft, using external connections through connector 1006.

According to one embodiment of the solid state analog altimeter switch 1000, two independent switch blocks 1000A and 1000B, may each include an altitude circuit 1200. Each altitude circuit 1200 may have all the functionality of altitude circuit 200 (FIGS. 3A-B and 4), according to one embodiment. Each altitude circuit 1200 may further include a temperature sensing circuit (not shown in FIG. 10, but see FIG. 11 and discussion below) which generates a TEMP OUT signal that can be used externally to monitor temperature, along with any other desired instrumentation.

Figure 11:
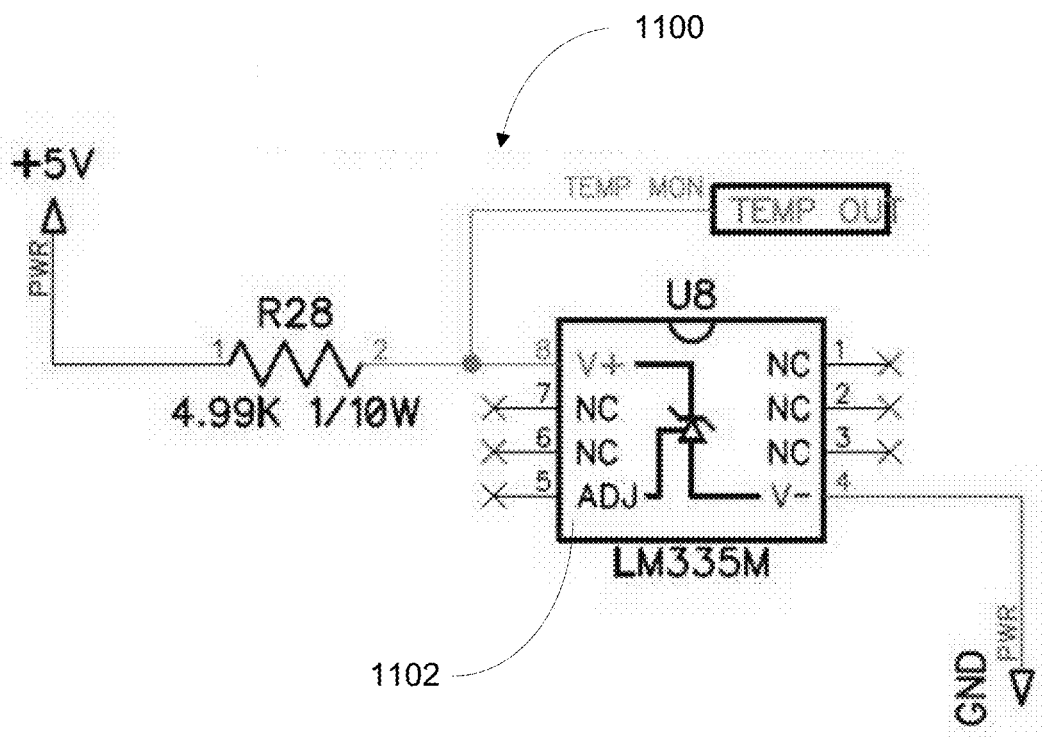
FIG. 11 is a circuit diagram of an embodiment of a temperature sensing circuit for use in an altitude circuit, according to the present invention.

FIG. 11 is a circuit diagram of an embodiment of a temperature sensing circuit 1100 that may be used to sense the temperature of the printed circuit board (not shown in FIG. 11). According to the illustrated embodiment, an analog temperature sensing circuit 1102, such as an LM335M, may be configured to generate TEMP OUT signal as shown in FIG. 11. However, it will be understood that any other suitable temperature sensing circuitry known to one of ordinary skill in the art may also be employed consistent with the teaching of the present invention.

Figure 12:
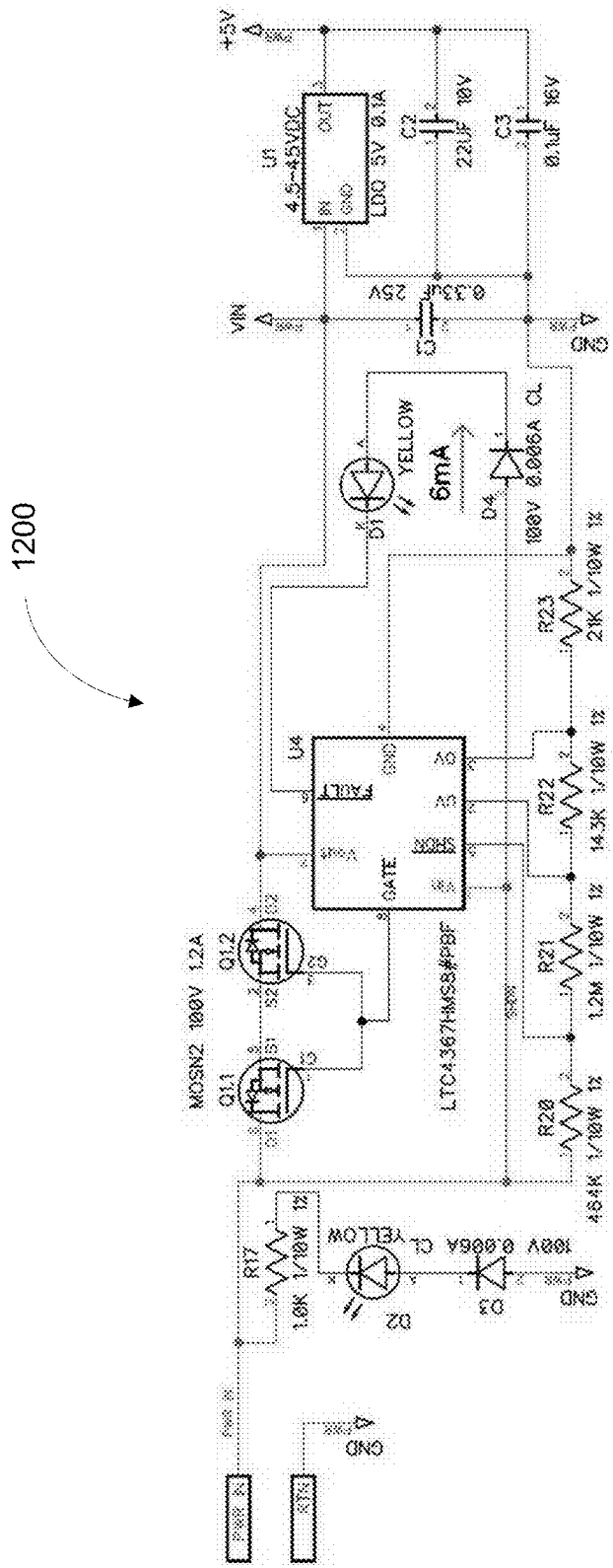
FIG. 12 is a circuit diagram of an embodiment of an input power protection circuit, according to the present invention.

FIG. 12 is a circuit diagram of an embodiment of an input power protection circuit 1200, according to the present invention. Input power protection circuit 1200 improves protection for over-voltage, under-voltage and reverse polarity conditions that may occur during various operating conditions including sounding rocket flights. While FIG. 12 illustrates a particular embodiment of input power protection circuit 1200 with particular component values and configuration, it will be understood that any equivalent electrical circuit that provides input power conditioning to prevent over-voltage, under-voltage and reverse polarity conditions, that provides suitable input power for operation of the circuitry described herein may be employed for use with the solid state analog altimeter switches 100, 600, 700, 900 and 1000 described herein. Such alternative and equivalent input power protection circuitry is considered to be within the scope of the teachings herein.

Figure 13:
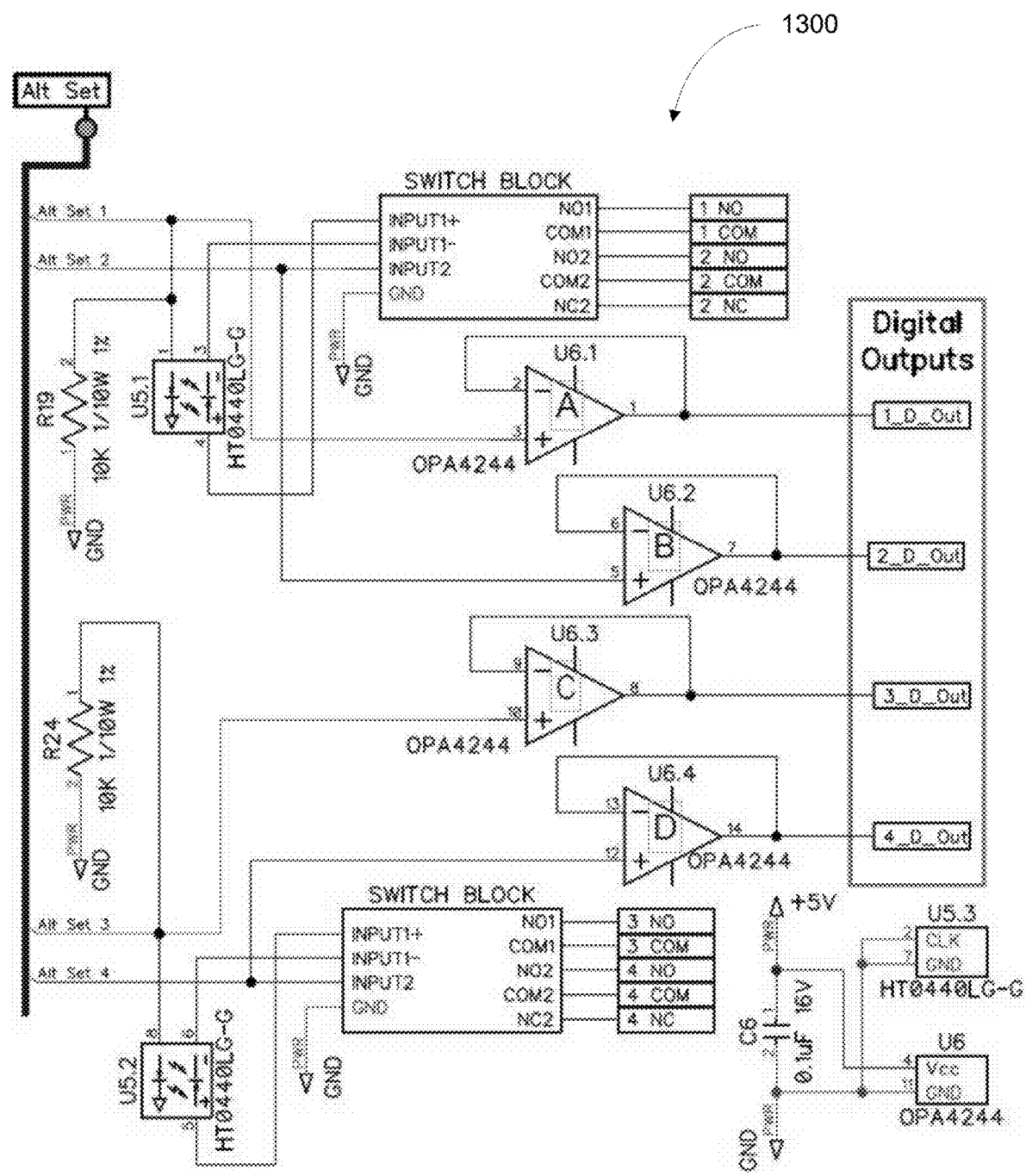
FIG. 13 is a circuit diagram of an embodiment of a solid state relay driver circuit, according to the present invention.

FIG. 13 is a circuit diagram of an embodiment of a solid state relay driver circuit 1300, according to the present invention. The solid state relay driver circuit 1300 provides an alternative embodiment to the switching circuit grouping 230 and high-power switch output buffers shown in FIG. 4. Note that the Alt Set bus signals shown in FIG. 13 represent the four output signals from the comparator grouping 220 circuitry shown in FIG. 4.

Figure 14:
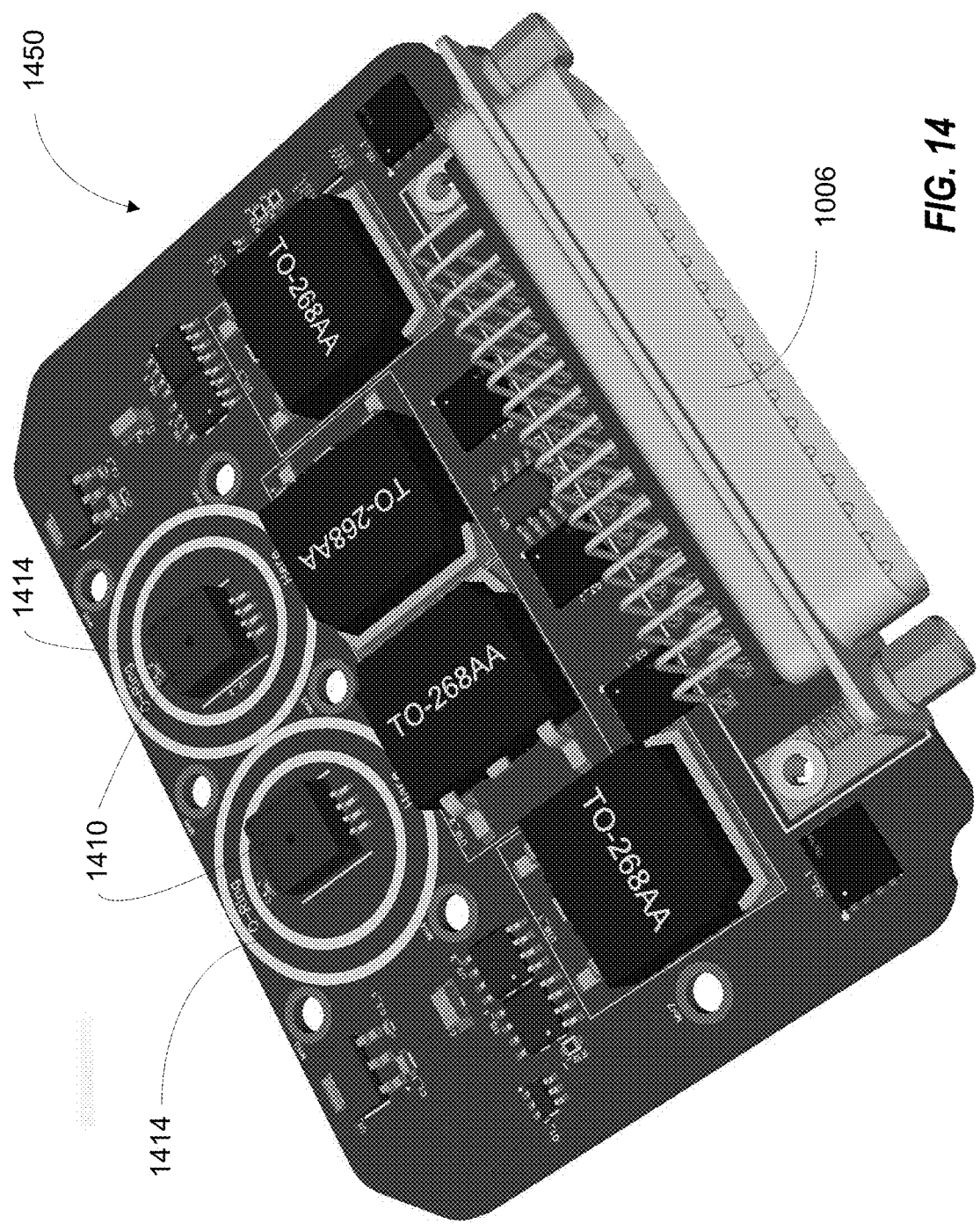
FIG. 14 is a perspective image of an embodiment of a printed circuit board for an embodiment of a solid state analog altimeter switch, according to the present invention.

FIG. 14 is a perspective image of an embodiment of a printed circuit board 1450 for an embodiment of a solid state analog altimeter switch 1000, according to the present invention. The printed circuit board 1450 may be placed within an enclosure not shown, but, similar to 650 and 750 discussed above. Alternatively, the enclosure (not shown) for printed circuit board 1450 may be manufactured with an additive 3-dimensional (3D) printer with integrated pressure ports 1408. Additive 3D printing is known to those of skill in the art and thus the specifics of how such an enclosure might be manufactured using 3D printing will not be further discussed herein.

The integrated pressure ports (not shown) may incorporate O-rings (not shown) for placement between the printed circuit board 1450 and the 3D printed enclosure (not shown) so as to eliminate the need for flexible hosing 710 or other means of plumbing to the pressure sensor 1410 (see also 210, FIG. 4). For example and not by way of limitation, such O-rings (not shown) may be placed around the solid state pressure ports 1410 on the printed circuit board 1450 at circles 1414 shown in FIG. 14. FIG. 14 also illustrates the 50-pin connector 1006, which may be used for external connections to power, instrumentation and other circuitry (none shown) through cabling (also not shown).

Having described the embodiments of the solid state analog altimeter switches 100, 600, 700, 900 and 1000 shown in the drawings and their particular structural features, functional features and variations using particular terminology, additional more general embodiments of the solid state analog altimeter switch 100, 600, 700, 900 and 1000 will now be disclosed. The following embodiments may or may not correspond precisely to the illustrated embodiments, but will have structure and features that are readily apparent based on the description of the drawings as provided herein.

An embodiment of a switch circuit is disclosed. The embodiment of a switch circuit may include a relay configured for receiving a low-power input signal and outputting a high-power normally-open output switching signal corresponding to the low-power input signal. The switch circuit may further include a high-power driver configured for receiving the low-power input signal and configured for generating a driving signal based on the low-power input signal. The switch circuit may further include at least one high-power transistor in communication with the solid state relay and the high-power driver and configured for receiving the driving signal, the at least one high-power transistor generating a high-power normally closed signal and a common signal in response to the driving signal.

According to another embodiment of the switch circuit, the relay may be a solid state relay. According to yet another embodiment of the switch circuit, the high-power driver may be a photovoltaic metal-oxide semiconductor field effect transistor (MOSFET) driver. According to still another embodiment of the switch circuit, the at least one high power transistor may include two depletion mode, n-channel, MOSFETs driven by the photovoltaic MOSFET driver.

An embodiment of a solid state altitude circuit is disclosed. The solid state altitude circuit may include a solid state pressure sensor configured for measuring an absolute barometric pressure and outputting an analog pressure voltage corresponding to a difference between the absolute barometric pressure and a reference vacuum pressure. The solid state altitude circuit may further include at least one comparator in communication with the solid state pressure sensor. The comparator may be configured for receiving the analog pressure voltage and comparing it to at least one input set voltage corresponding to a preselected pressure. The preselected pressure may correspond to a preselected altitude above sea level. The comparator may generate a trigger signal based on comparing the analog pressure voltage to the at least one set voltage. The solid state altitude circuit may further include at least one high-power switch in communication with the comparator. The at least one high-power switch may be configured for receiving the trigger signal and driving the at least one high-power switch to an on state or an off state based on the trigger signal.

According to another embodiment of the altitude circuit, the at least one high-power switch may include four power switches. Alternative embodiments of the altitude circuit may have more or less than for power switches. According to yet another embodiment of the altitude circuit, the at least one input set voltage may further include four inputs configured for receiving four corresponding set voltages representative of four preselected altitudes above sea level. Alternative embodiments of the altitude circuit may include more or fewer than four inputs.

According to yet another embodiment of the altitude circuit, each of the at least one high-power switch may further include a relay configured for receiving a low-power input signal and outputting a high-power normally-open output switching signal corresponding to the low-power input signal. According to this yet another embodiment, the at least one high-power switch may further include a high-power driver configured for receiving the low-power input signal and configured for generating a driving signal based on the low-power input signal. According to this yet another embodiment, the at least one high-power switch may further include at least one high-power transistor in communication with the solid state relay and the high-power driver and configured for receiving the driving signal. This embodiment of the at least one high-power transistor may further be configured for generating a high-power normally closed signal and a common signal in response to the driving signal.

An embodiment of a solid state analog altimeter switch is disclosed. The embodiment of a solid state analog altimeter switch may include a resistor network configured for delivering a plurality of preselected set voltages, each of the preselected set voltages corresponding to a preselected altitude above sea level. The embodiment of a solid state analog altimeter switch may further include a solid state altitude circuit in communication with the resistor network and configured to receive the plurality of preselected voltages.

According to one embodiment of the solid state analog altimeter switch, the solid state altitude circuit may include a solid state pressure sensor configured for measuring an absolute barometric pressure and outputting an analog pressure voltage corresponding to a difference between the absolute barometric pressure and a reference vacuum pressure. This embodiment of a solid state altitude circuit may further include a comparator in communication with the solid state pressure sensor for receiving the analog pressure voltage and comparing it to the plurality of set voltages. According to this embodiment, the comparator may be configured to generate a trigger signal based on comparing the analog pressure voltage to the plurality of set voltages. This embodiment of a solid state altitude circuit may further include at least one high-power switch in communication with the comparator for receiving the trigger signal and driving the at least one high-power switch to an on state or an off state based on the trigger signal.

According to another embodiment of the solid state analog altimeter switch, the resistor network may include four resistors for generating four preselected set voltages. According to another embodiment of the solid state analog altimeter switch, each of the at least one high-power switches may include a relay configured for receiving a low-power input signal and outputting a high-power normally-open output switching signal corresponding to the low-power input signal. Each of the at least one high-power switches may further include a high-power driver configured for receiving the low-power input signal and configured for generating a driving signal based on the low-power input signal. Each of the at least one high-power switches may further include at least one high-power transistor in communication with the solid state relay and the high-power driver and configured for receiving the driving signal, the at least one high-power transistor generating a high-power normally closed signal and a common signal in response to the driving signal.

According to another embodiment of the switch circuit, the relay may include a solid state relay. According to yet another embodiment of the switch circuit, the high-power driver may include a photovoltaic metal-oxide semiconductor field effect transistor (MOSFET) driver. According to still another embodiment of the switch circuit, the at least one high power transistor may include two depletion mode, n-channel, MOSFETs driven by the photovoltaic MOSFET driver.

According to another embodiment, the solid state analog altimeter switch may further include two independent solid state altitude circuits, each independent solid state altitude circuit having an independent absolute barometric pressure sensor and four preselected switching events, each of the four preselected switching events corresponding to a preselected altitude.

An embodiment of a method of triggering switching events at preselected altitudes is disclosed. The method may include providing a solid state analog altimeter switch, sensing absolute barometric pressure, comparing the absolute barometric pressure to a reference vacuum pressure, determining a measured altitude corresponding to the difference between the absolute barometric pressure and the reference vacuum pressure, comparing the measured altitude to a plurality of preselected altitudes and triggering one of the switching events upon the measured altitude equaling one of the preselected altitudes. According to one embodiment of the method, the solid state analog altimeter switch provided may have the characteristics of any one of the embodiments of a solid state analog altimeter switch as described herein.

The embodiments of the circuitry forming the solid state analog altimeter switch 100, 600 and 700 disclosed herein and its components may be formed of any suitable semiconductor materials using processes known to those of ordinary skill in the art.

In understanding the scope of the present invention, the term "configured" as used herein to describe a component, section or part of a device may include any suitable mechanical hardware that is constructed or enabled to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part", "section", "portion", "member", or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions relative to embodiments of the invention described herein. Finally, terms of degree such as "substantially", "about" and "approximately" as used herein mean a reasonable amount of deviation of the modified term such that the end result is not significantly changed.

While the foregoing features of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:
1. A solid state analog altimeter switch, comprising:
a resistor network configured for delivering a plurality of preselected set voltages, each of the preselected set voltages corresponding to a preselected altitude above sea level; and
a solid state altitude circuit in communication with the resistor network and configured to receive the plurality of preselected voltages, the solid state altitude circuit, comprising:
a solid state pressure sensor configured for measuring an absolute barometric pressure and outputting an analog pressure voltage corresponding to a difference between the absolute barometric pressure and a reference vacuum pressure;
a comparator in communication with the solid state pressure sensor for receiving the analog pressure voltage and comparing it to the plurality of set voltages, the comparator generating a trigger signal based on comparing the analog pressure voltage to the plurality of set voltages; and
at least one high-power switch in communication with the comparator for receiving the trigger signal and driving the at least one high-power switch to an on state or an off state based on the trigger signal.

2. The solid state analog altimeter switch according to claim 1, wherein the resistor network comprises four resistors for generating four preselected set voltages.

3. The solid state analog altimeter switch according to claim 1, wherein each of the at least one high-power switch comprises:
   a relay configured for receiving a low-power input signal and outputting a high-power normally-open output switching signal corresponding to the low-power input signal;
   a high-power driver configured for receiving the low-power input signal and configured for generating a driving signal based on the low-power input signal; and
   at least one high-power transistor in communication with the solid state relay and the high-power driver and configured for receiving the driving signal, the at least one high-power transistor generating a high-power normally closed signal and a common signal in response to the driving signal.

4. The switch circuit according to claim 3, wherein the relay is a solid state relay.

5. The switch circuit according to claim 3, wherein the high-power driver comprises a photovoltaic metal-oxide semiconductor field effect transistor (MOSFET) driver.

6. The switch circuit according to claim 5, wherein the at least one high power transistor comprises two depletion mode, n-channel, MOSFETs driven by the photovoltaic MOSFET driver.

7. The solid state analog altimeter switch according to claim 1, further comprising two independent solid state altitude circuits, each independent solid state altitude circuit having an independent absolute barometric pressure sensor and four preselected switching events, each of the four preselected switching events corresponding to a preselected altitude.

8. A method of triggering switching events at preselected altitudes, the method comprising:
   providing a solid state analog altimeter switch;
   sensing absolute barometric pressure;
   comparing the absolute barometric pressure to a reference vacuum pressure;
   determining a measured altitude corresponding to the difference between the absolute barometric pressure and the reference vacuum pressure;
   comparing the measured altitude to a plurality of preselected altitudes; and
   triggering one of the switching events upon the measured altitude equaling one of the preselected altitudes.

9. The method according to claim 8, wherein providing a solid state analog altimeter switch further comprises providing:
   a resistor network configured for delivering a plurality of preselected set voltages, each of the preselected set voltages corresponding to a preselected altitude above sea level; and
   a solid state altitude circuit in communication with the resistor network and configured to receive the plurality of preselected voltages, the solid state altitude circuit, comprising:
      a solid state pressure sensor configured for measuring an absolute barometric pressure and outputting an analog pressure voltage corresponding to a difference between the absolute barometric pressure and a reference vacuum pressure;
      a comparator in communication with the solid state pressure sensor for receiving the analog pressure voltage and comparing it to the plurality of set voltages, the comparator generating a trigger signal based on comparing the analog pressure voltage to the plurality of set voltages; and
      at least one high-power switch in communication with the comparator for receiving the trigger signal and driving the at least one high-power switch to an on state or an off state based on the trigger signal.

10. The method according to claim 8, wherein providing the at least one high-power switch comprises providing:
    a relay configured for receiving a low-power input signal and outputting a high-power normally-open output switching signal corresponding to the low-power input signal;
    a high-power driver configured for receiving the low-power input signal and configured for generating a driving signal based on the low-power input signal; and
    at least one high-power transistor in communication with the solid state relay and the high-power driver and configured for receiving the driving signal, the at least one high-power transistor generating a high-power normally closed signal and a common signal in response to the driving signal.

11. The method according to claim 10, wherein the relay is a solid state relay.

12. The method according to claim 10, wherein the high-power driver comprises a photovoltaic metal-oxide semiconductor field effect transistor (MOSFET) driver.

13. The method according to claim 12, wherein the at least one high power transistor comprises two depletion mode, n-channel, MOSFETs driven by the photovoltaic MOSFET driver.

* * * * *